United States Patent [19]

Fabbro et al.

[11] Patent Number: 4,779,711
[45] Date of Patent: Oct. 25, 1988

[54] BRAKE MOTOR WITH AUTOMATIC ADJUSTMENT

[75] Inventors: Edgard Fabbro, Le Vésinet; Pierre Pressaco, La Courneuve, both of France

[73] Assignee: Bendix France, Drancy, France

[21] Appl. No.: 60,186

[22] Filed: Jun. 9, 1987

[30] Foreign Application Priority Data

Jun. 12, 1986 [FR] France .................. 86 08503

[51] Int. Cl.$^4$ .............................................. F16D 65/56
[52] U.S. Cl. ........................... 188/196 D; 188/196 A; 188/196 M; 188/196 P; 188/79.5 S
[58] Field of Search ......... 188/196 A, 196 D, 196 M, 188/196 P, 71.9, 79.5 R, 79.5 SS, 79.5 S

[56] References Cited

U.S. PATENT DOCUMENTS

| | | | |
|---|---|---|---|
| 3,942,827 | 3/1976 | Warlop et al. | 188/196 BA |
| 3,983,975 | 10/1976 | Wright | 188/71.9 |
| 4,306,635 | 12/1981 | Mitchell | 188/72.4 |
| 4,635,760 | 1/1987 | LeMarchand et al. | 188/71.9 |

FOREIGN PATENT DOCUMENTS

| | | |
|---|---|---|
| 0053548 | 6/1982 | European Pat. Off. . |
| 0175600 | 3/1986 | European Pat. Off. . |
| 2131053 | 1/1973 | Fed. Rep. of Germany . |
| 3136958 | 3/1983 | Fed. Rep. of Germany . |
| 3410249 | 9/1985 | Fed. Rep. of Germany ..... 188/71.9 |
| 1535731 | 7/1968 | France . |
| 2262230 | 9/1975 | France . |
| 1206276 | 9/1970 | United Kingdom . |

Primary Examiner—Andres Kashnikow
Assistant Examiner—Mark T. Le
Attorney, Agent, or Firm—Larry J. Palguta; Ken C. Decker

[57] ABSTRACT

The brake motor comprises an inserted piston (26) slideably mounted in a passage (24) formed in the front wall (4) of the brake piston (1) which has, near the other end (31) of the inserted piston (26), a counter-bearing surface (34) facing inward, thus enabling the engagement of an actuating tool (0) to exert, via the inserted piston (26), an axial thrust on the rotating member (16) of the automatic adjustment device of the brake motor and, at the same tine, an axial load in the opposite direction on the brake piston (1) enabling the friction clutch (18, 19) to release between the brake piston (1) and the rotating member (16), after which an axial translation (F) of the assembly enables the resetting of the automatic adjustment device of the brake motor.

7 Claims, 3 Drawing Sheets

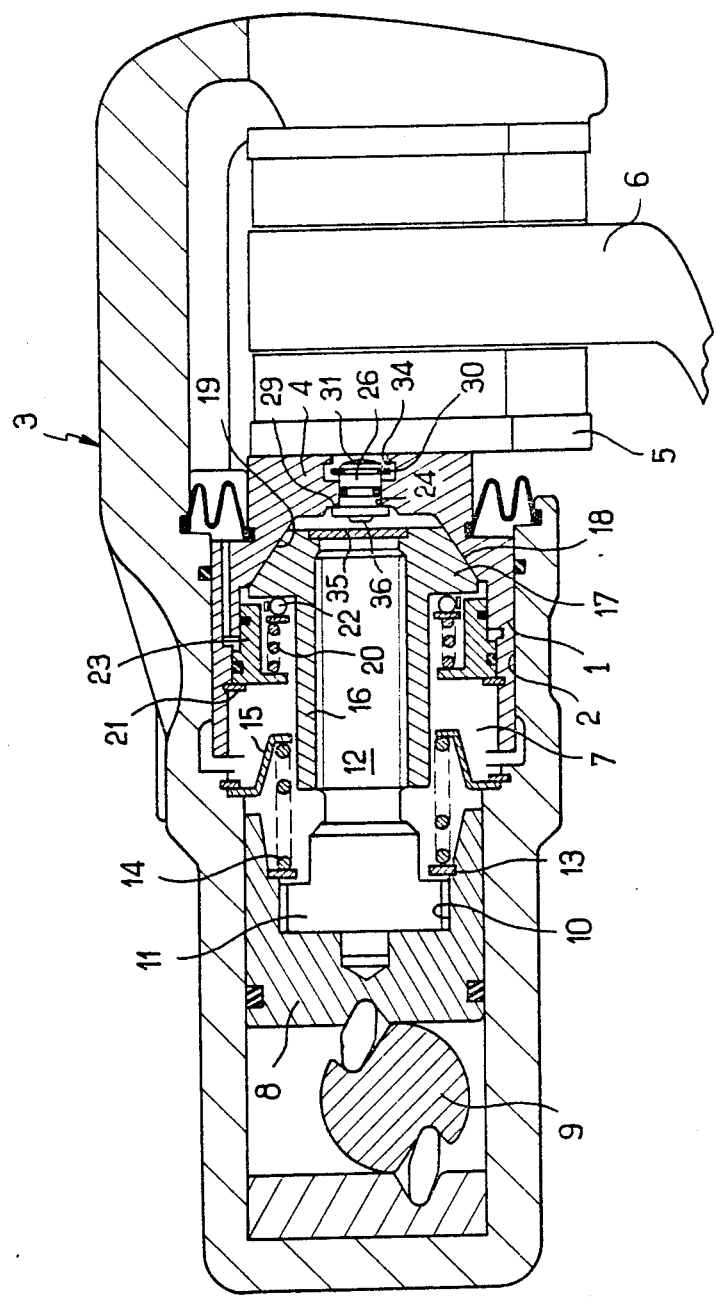
FIG_1

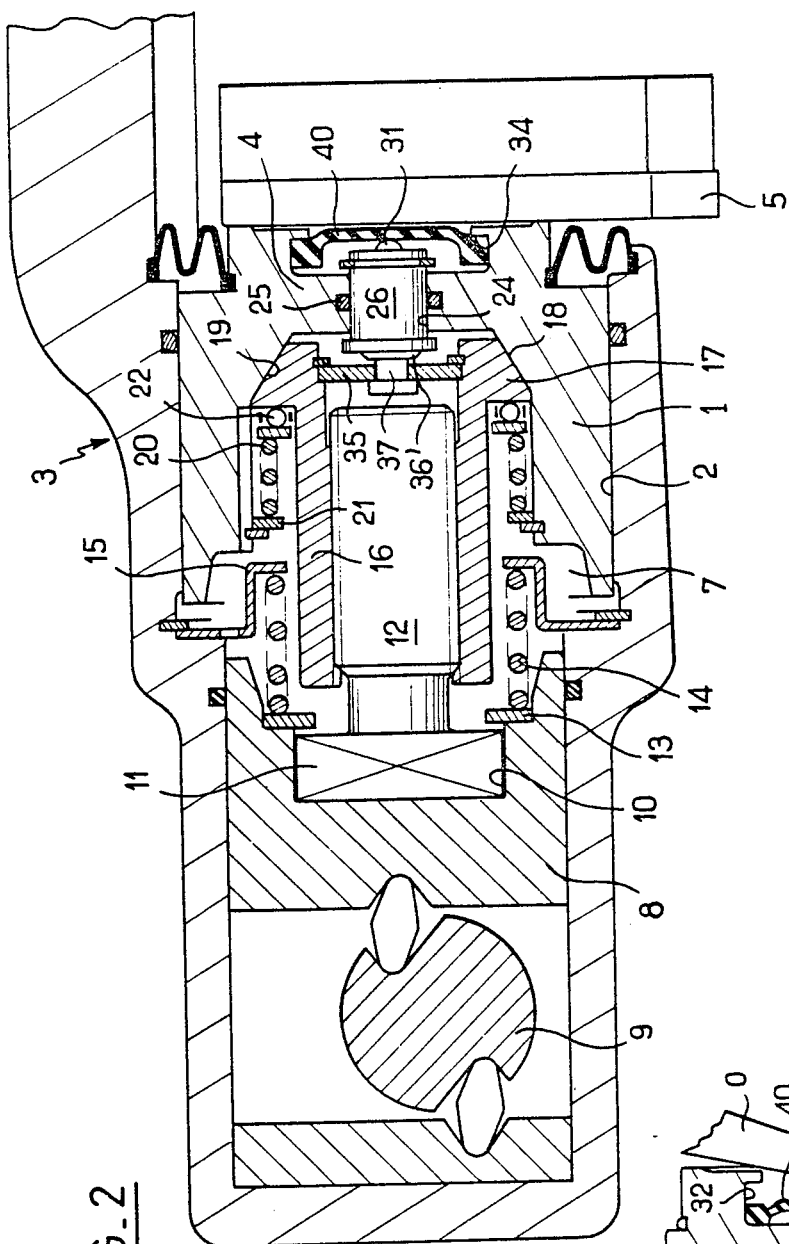
FIG_2
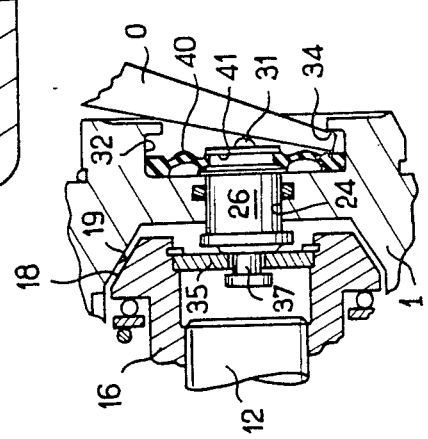
FIG_5

BRAKE MOTOR WITH AUTOMATIC ADJUSTMENT

The present invention concerns brake motors with automatic adjustment, particularly but not exclusively for vehicle disc brakes, of the type comprising a brake piston sliding in a body to operate at least one friction member, an automatic adjustment device of the reversible thread screw/nut type comprising a member locked in rotation associated with a rotating member accompanying, in operation, the axial movement of the brake piston to take up play resulting from wear in the friction member, the rotating member comprising an end extending into the brake piston, near a front wall of the latter, working together with the friction member, and being connectable, to be locked in rotation to the brake piston by a clutch means, and an insert mounted sealingly in a through passage formed in the front wall of the brake piston, the insert having an inner end able to work together with the said end of the rotating member to move this latter axially to reset the automatic adjustment device in answer to an axial load applied to an outer end of the insert.

A brake motor of this type is described in the document DE-A-21 13 317. In this document, the insert consists of an assembly of a ball and two discs mounted in an inner part of the enlarged diameter of the through passage emerging outwards by a part of small diameter enabling the axial insertion of an actuating tool to reset the automatic adjustment device by exerting on the insert and, consequently, on the rotating member of the automatic adjustment device, a purely axial thrust. On account of the connection between the rotating member and the brake piston by the clutch means, in this instance by cone-in-cone friction, the resetting requires a very considerable initial axial load to be applied on the insert, via the actuating tool, to overcome the connection by conversion of the axial load into rotating movement of the rotating member resulting from its reversible thread meshing with the non-rotating member of the automatic adjustment device, which presents practical problems taking into account the sometimes poor accessibility of the outer part of the through passage and which could lead to damage of the insert and/or the rotating member.

The object of the present invention is to provide improvements to the brake motor of the type under consideration enabling the resetting to be carried out more easily and more securely and offering, as well, the possibility of numerous adaptations enabling efficient and reliable brake motors to be made.

To do this, according to a feature of the invention, the insert is made in the shape of a piston sliding in a cylindrical part of the through passage and comprises an outer end in the shape of a round head, the passage forming, in the wall of the brake piston, at the friction member end, a counter-bearing surface opposite the cylindrical part of the passage.

According to a more particular feature of the invention, the counter-bearing surface is formed by an annular groove of enlarged diameter in which the cylindrical part of the passage receiving the inserted piston emerges.

It is thus possible, with such an arrangement, to insert the end of an actuating tool, transversely relative to the brake motor axis, between the round head of the inserted piston and the adjacent counter-bearing surface, thus interfering little with the component members of the brake, so that the application of a tilting couple on the tool causes an axial movement of the insert towards the inside acting to retract the rotating member, accompanied by an opposing axial movement of the brake piston outwards, causing the release of the connection between these two components by the clutch means, after which a movement of the tool in translation inwards enables the rotating member to rescrew itself relative to the non-rotating member at the same time pushing the brake piston back inside the body to an initial retracted position suitable for replacing a worn friction member by a friction member with a new lining.

Another object of the present invention is to provide a brake motor of the type under consideration having simple means of inhibition of the automatic adjustment device in order to prevent over-adjustment which might occur in the event of temporary elastic distortion of the brake assembly comprising the brake motor and resulting from a heavy braking load applied to the friction member.

To do this, according to another feature of the invention, the means of inhibition comprise an inhibiting piston slideably mounted in the brake piston and working together with the rotating member to prevent it rotating during an operational movement of the brake piston when the actuating pressure of the latter exceeds a preset value, the inhibiting piston being advantageously made up by the inserted piston equipped so as to be connectable, at least temporarily, to the rotating member of the automatic adjustment device.

Other features and advantages of the present invention will become apparent from the following description of the embodiment made with reference to the attached drawings, which:

FIG. 1 is a schematic view in longitudinal section of a first embodiment of a brake motor with automatic adjustment according to the invention;

FIG. 2 is a view similar to FIG. 1 of a second embodiment of the invention;

FIG. 5 is a partial view similar to FIG. 3 showing a variation of the invention.

In the description which follows and in the drawings, identical or similar components bear the same reference numbers, possibly with indices.

Figure 3:
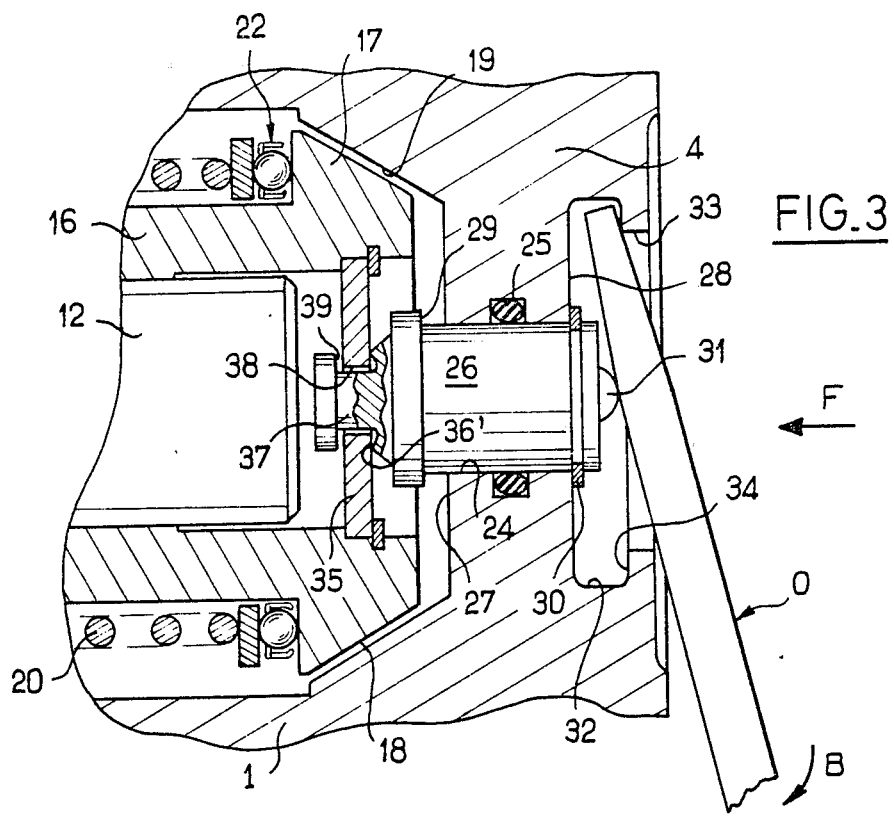
FIG. 3 is a partial view, in cross-section, in larger scale, of FIG. 2 showing the implementation of the resetting of a brake motor according to the invention.

In FIGS. 1 and 2 there is shown, as an example, a brake motor having generally a hollow brake piston, marked generally by reference 1, slideably mounted in a bore 2 of a brake body 3, in effect a disc brake caliper carried slideably in a fixed support (not shown), the piston 1 having a front end wall 4 working together in engagement with a friction member 5 to push the latter in friction engagement up against a member to be braked, in effect a brake disc 6. In the embodiments shown, the piston 1 demarcates the end, in the bore 2 of the body 3, of an hydraulic chamber 7 whose other end is demarcated by a plunger piston 8 sliding in a rear part of reduced diameter of the bore 2 in the body 3 and actuable by a mechanical actuator 9 ensuring typically the function of a parking brake. In the embodiments in FIGS. 1 and 2, the enlarged rear end 11 of a threaded screw 12 which extends towards the front into the chamber 7 and inside the brake piston 1, rests in a front recess 10 of the plunger piston 8, the recess 10 and the end 11 have matching transverse profiles thus preventing any rotation of the screw 12 on its axis. The end 11 of the screw 12 is held axially, with an operating clearance, relative to the plunger piston 8 by a washer 13 forming the rear bearing for a return spring 14 coaxial to the screw 12 and bearing at the front on a collar 15 made integral with the body 3 to always act on the plunger piston 8 rearwards, in engagement with the mechanical actuator 9. A long rotating nut 16, having a front end of enlarged outside diameter 17 comprising a front face 18 able to work together in frictional engagement with an adjacent inner face 19 of the brake piston 1, works together meshed with a reversible thread on the screw 12. In the embodiments shown, the engagement faces 18 and 19 are, with advantage, tapered, but, in variation, they may also be made in the shape of transverse annular faces, in which case at least one of these annular faces has a surface of high coefficient of friction, for example, a backing in friction material. The nut 16 is acted on towards the front to bring the faces 18 and 19 into engagement contact by means of a spring 20 arranged coaxially round the nut 16, bearing at the rear on a washer 21 mounted in the brake piston 1 and bearing at the front, via a ball thrust race 22, against the rear face of the end of enlarged diameter 17 of the nut 16. With such an arrangement, it will be understood that, if, in the event of wear in the friction member 5, the brake piston 1 should move further than the operating clearances of the rod 12 and the threads between this latter and the nut 16, this additional movement of the piston will result in a separation of the faces 18 and 19 freeing the connection between the brake piston 1 and the nut 16, this space being compensated for immediately by rotation with movement forward of the nut 16 on the screw 12 due to the effect of the spring 20.

In the embodiment in FIG. 1, the rear support between the spring 20 and the washer 21 is ensured by a stepped piston 23 sealingly and slideably mounted in the brake piston 1 and able to move as a result of the pressure existing in the chamber 7 to hold the surfaces 18 and 19 flat against one another when the pressure in the chamber 7 exceeds a preset value, the movement of the brake piston 1 then causing, via the nut 16, a forward movement of the screw 12, to meet the return spring 14.

In accordance with the invention, a through passage is provided in the front wall 4 of the brake piston 1, comprising a main cylindrical part 24 emerging into the chamber 7, typically coaxial to the assembly of the brake piston and the automatic adjustment device, in which a small cylindrical inserted piston 26 projecting axially on either side of the cylindrical part of the passage 24, is sealingly and slideably mounted, by means of a seal 25, and comprising bearing means able to work together with the axially opposing parts 27 and 28 of the front wall 4 in which the cylindrical part 24 emerges to restrict the axial movement of the inserted piston 26, and consisting, for example, of a collar projecting radially outward 29 formed by the part of the piston 26 extending into the chamber 7, and by a circlip 30 added on to the outside projecting end of the piston 26. This outside end of the piston 26 forms a round-ended head 31 and, in the embodiments of FIGS. 1 and 2, the cylindrical part of the passage 24 emerges outwards into an annular groove 32 of enlarged diameter itself emerging outwards by a part of a bore of reduced diameter 33 thus defining an annular surface 34 facing opposite and inwards and surrounding the outside end of the inserted piston 26. The inside end of this latter is made to work in bearing engagement against a front plate 35 of the nut 16, advantageously made of a plate added on inside in the end of enlarged diameter 17 of the nut 16.

In the embodiment of FIG. 1, comprising an inhibiting piston 23 inside the brake piston 1, the resetting inserted piston 26 has a round head on the inner end 36 to make an engagement by direct contact with the plate 35.

The embodiment of FIGS. 2 and 3 differs from the previous one due to the fact that the operation of the inhibiting piston 23 is ensured here by the resetting inserted piston 26. For this, it has, on the inside, an extension 37 passing through a central orifice 38 made in the plate 35 and finished with a ring or a circlip forming an annular bearing 39 able to work together with the rear face of the plate 35. To assist the rotation of the nut 16 during the resetting phase by axial thrust via the inserted piston 26, this works together with the front face of the plate 35 by a mainly linear contact zone formed by an annular boss 36'. As in the embodiment of FIG. 1, when the pressure in the chamber 7 increases, the resetting piston 26 is pushed forwards in the cylindrical part of the passage 24, this forward movement of the piston, 26 being made use of here, by engagement of the shoulder 39 with the rear face of the plate 35 of the nut 16, to exert a forward pull on this latter tending to force the faces 18 and 19 one against the other, without the annular bearing surface 29 coming into contact with the inside face 27 of the front wall 4 of the piston 1, in such a manner as to prevent, above a preset pressure level, a separation of these two faces liable to allow the nut 16 to turn to make an automatic adjustment, in this instance, the movement of the brake piston 1 being accompanied by a similar movement of the assembly of the nut 16 and of the screw 12 to meet the return spring 14. As shown in the FIG. 2, a removable protective cover in soft material 40 is fitted to advantage in the annular groove 32 to protect the piston 26 from any contamination.

A description now follows, relative to FIG. 3, of the operating method to reset the automatic adjustment device of the brake motor according to the invention enabling a worn friction member 5 to be replaced by a new friction member. When the friction member 5 is worn, the piston 1 has moved forward a certain amount in the bore 2 under the effect of the gradual unscrewing of the nut 16 on the screw 12 to compensate for wear. Thus it is necessary to push back the assembly of the piston 1 and the nut 16 in the bore 2 in order to fit a new friction member in place. To do this, the cover 40 is removed to reveal the annular groove 32. An actuating tool 0 having a tapered head of the shape shown in FIG. 3, is then introduced transversely, that is to say with the end of the tool 0 engaged in the groove 32 and an adjacent part of this end in contact with the round-headed end 31 of the piston 26. By applying a tilting couple in the direction of arrow B on the tool 0, the end of the tool 0 takes its leverage on the counter-bearing face 34 in the groove 32, the adjacent end part of the tool 0 pushing back the piston 26 simultaneously towards the inside of the chamber 7 until its inner contact zone 36 or 36' comes into contact with the plate 35 of the nut 16. An additional tilting couple B applied to the tool 0 causes the piston 26/nut 16 assembly to retract at the same time as the piston 1 moves forward, thus permitting, as shown in FIG. 3, the engagement faces 18 and 19 to separate one from another, by an amount corresponding to the distance the circlip 30 moves to bear on the outer face 28 of the wall 4 of the piston 1. In the layout thus reached in FIG. 3, an additional axial load exerted by the tool 0, via the piston 26, on the nut 16, enables it to turn on the screw 12 and thus to rescrew itself up on this latter, a translation load F applied to the tool 0 then allowing the nut 16 and the piston 1 to return to the initial position as shown in FIGS. 1 and 2, after which the tool 0 is simply removed and the cover 40 refitted in position. As a variation, as shown in FIG. 5, the cover 40 is annular and is mounted by its periphery with a considerable axial clearance in the annular groove 32 forming the shoulder for the counter-bearing 34, and by its central part in an annular groove 41 in the outer end of the inserted piston 26, thus leaving the end 31 of this latter exposed on the outside. As shown in FIG. 5, this variation enables the tool 0 to be inserted in the actuating position without having to remove the cover 40.

Figure 4:
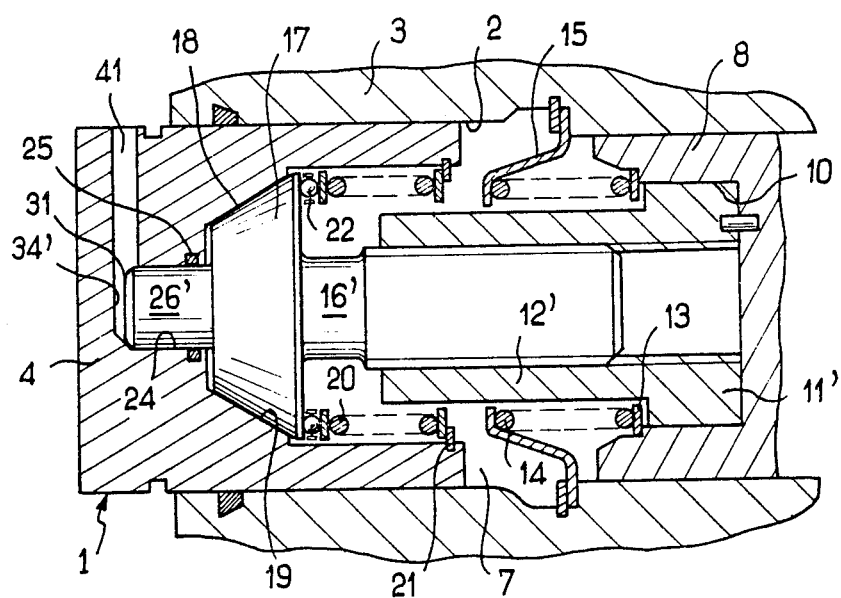
FIG. 4 is a partial view, in longitudinal section, of a third embodiment of the invention.

The embodiment of FIG. 4 differs essentially from those described earlier by the fact that the rotating member of the automatic adjustment device here comprises a screw 16' having the end part of enlarged outside diameter 17 working together in friction engagement with the inner face 18 of the piston 1, the screw 16' working together with a nut locked in rotation 12' having an end 11' located in the recess 10 of the plunger piston 8 in the same manner as the screw 12 in the preceding embodiments. In the embodiment of FIG. 4, the cylindrical part of the passage 24 does not emerge axially outwards in the front wall 4 of the piston 1 but extends laterally by at least a transverse part of the passage 41 extending considerably radially and permitting the transverse insertion of the actuating tool 0 to work together with the outer round head of the resetting inserted piston 26', the counter-bearing face 34' for the end of the actuating tool 0 being formed here by the side of the transverse passage 41 opposite the outer end of the piston 26'. In the embodiment of FIG. 4, the piston 26' may be made in a single piece with the screw 16', thus ensuring the operation of the automatic adjustment inhibiting piston in the same manner as the piston 26 in the embodiment of FIGS. 2 and 3.

In the various embodiments described above, the operation of the parking brake is ensured by bringing the mechanical actuator 9 into use to push the plunger piston 8 forwards and, via the automatic adjustment device 12,16 or 12',16', the brake piston 1 and so push the friction member 5 up against the disc 6 in frictional engagement.

Although the present invention has been described relative to particular embodiments, it is not in fact limited but, on the contrary, is amenable to modifications and variations which will be apparent to the specialist.

We claim:

1. A brake motor, comprising a brake piston sliding in a body to operate at least one friction member, an automatic adjustment device of a reversing thread screw/nut type comprising a non-rotating member associated with a rotating member accompanying, in operation, axial movement of the brake piston to take up play resulting from wear in the friction member, the rotating member having an end extending into the brake piston near a front wall of the brake piston, the front wall cooperating with the friction member, the rotating member being connectable, to be locked in rotation, to the brake piston by clutch means and an insert mounted sealingly in a through passage formed in the front wall, the insert having an outer end and an inner end cooperating with the end of the rotating member to move the rotating member axially so as to reset the automatic adjustment device in response to an axial load applied to the outer end of the insert, characterized in that the insert is shaped like a piston and slides in a cylindrical part of the through passage and the outer end formed as a head member, the through passage forming, in the front wall of the brake piston at a friction member side, a counter-bearing surface disposed opposite the cylindrical part of the through passage, the motor comprising means for limiting axial movement of the insert via the front wall of the brake piston so as to limit the axial movement of the insert in the cylindrical part of the through passage at least in a direction toward an interior of the brake piston, and means for inhibiting the automatic adjustment device when an operating pressure of the brake piston exceeds a preset value, the inhibiting means comprising the insert which is an inhibiting piston mounted slidably in the brake piston and cooperating with the rotating member to prevent the rotating member from rotating during an operational movement of the brake piston.

2. The brake motor according to claim 1, characterized in that the inner end of the insert passes through a front end plate of the rotating member and comprises two opposite surfaces engageable with axially opposing faces of the front end plate.

3. The brake motor according to claim 1, characterized in that the insert is integral with the rotating member.

4. The brake motor according to claim 1, characterized in that the motor comprises a mechanical control connected to the non-rotating member of the automatic adjustment device and acting on the brake piston via the automatic adjustment device.

5. The brake motor according to claim 1, characterized in that the counter-bearing surface is formed by an annular groove of enlarged diameter into which emerges the cylindrical part of the through passage.

6. The brake motor according to claim 5, characterized in that the motor comprises a protective cover fitted in the annular groove.

7. The brake motor according to claim 1, characterized in that the counter-bearing surface is formed at least by a part of a passage extending transversely in the front wall of the brake piston.

* * * * *